United States Patent [19]

Gungl et al.

[11] Patent Number: 5,912,453
[45] Date of Patent: Jun. 15, 1999

[54] MULTIPLE APPLICATION CHIP CARD WITH DECOUPLED PROGRAMS

[75] Inventors: Klaus Gungl, Boblingen; Son Dao Trong, Stuttgart, both of Germany

[73] Assignee: International Business Machines Corporation, Armonk, N.Y.

[21] Appl. No.: 08/720,162

[22] Filed: Sep. 25, 1996

[30] Foreign Application Priority Data

Sep. 29, 1995 [DE] Germany .......................... 195 36 169

[51] Int. Cl.$^6$ ................................................. G06K 19/00
[52] U.S. Cl. ......................... 235/492; 235/379; 235/380; 235/382; 902/26
[58] Field of Search .................................. 235/492, 380, 235/382, 379; 902/26

[56] References Cited

U.S. PATENT DOCUMENTS

| | | | |
|---|---|---|---|
| 4,709,137 | 11/1987 | Yoshida | 235/379 |
| 4,734,568 | 3/1988 | Watanabe | 235/487 |
| 4,797,542 | 1/1989 | Hara | 235/380 |
| 4,802,218 | 1/1989 | Wright et al. | 235/492 |
| 4,831,245 | 5/1989 | Ogasawara | 235/492 |
| 4,930,129 | 5/1990 | Takahira | 371/40.4 |
| 4,985,921 | 1/1991 | Schwartz | 380/24 |
| 5,049,728 | 9/1991 | Rovin | 235/492 |
| 5,229,652 | 7/1993 | Hough | 307/104 |
| 5,569,897 | 10/1996 | Masuda | 235/379 |
| 5,578,808 | 11/1996 | Taylor | 235/380 |
| 5,644,781 | 7/1997 | Hagimori | 395/800 |
| 5,679,945 | 10/1997 | Renner et al. | 235/492 |
| 5,682,027 | 10/1997 | Bertina et al. | 235/380 |

OTHER PUBLICATIONS

SourceBook of Automatic Identification and Data Collection by Russ Adams, pp.158–159, Jan. 1990.

*Primary Examiner*—Donald Hajec
*Assistant Examiner*—Douglas X. Rodriguez
*Attorney, Agent, or Firm*—K. O. Hesse

[57] ABSTRACT

The integration of multiple application programs on one chip card is described, whereby the application programs stored on it do not have access to each other, which is achieved through a separation and de-coupling of the individual programs from one another. A first embodiment has several mutually-independent units, consisting respectively of a processor unit and a memory unit. Communication of these independent units with the external world and also with each other takes place through a control unit. A communication of the independent units with each other can only take place through the respective processor units, so that the linked memory units may not be accessed by circumvention of the processor unit. In a further embodiment, the separation of different applications on a chip card with only one processor takes place through the insertion of a separation of the application segments in the memory area of the chip card. The separation has as a result that each application may only access one predetermined area within the memory, and that access outside of the specified memory area is disabled for this application.

3 Claims, 3 Drawing Sheets

MULTIPLE APPLICATION CHIP CARD WITH DECOUPLED PROGRAMS

BACKGROUND OF THE INVENTION

1. Field of the Invention

The invention relates to the integration of multiple applications on one chip card.

2. Description of Related Art

Cards, roughly in the size and shape of a credit card, with an integrated electronic chip, and made preferably of plastic or metal are known today as data-carrier cards or chip cards. In contrast to simple storage cards which are also known as memory-chip cards or memory cards, intelligent data-carrier cards, also known as smart cards, possess, in addition to their memory function, their own processor for control of the data stored on the chip of the data-carrier card. This makes better protection of the data possible, and results in improved functioning of the chip cards. In general, simple memory cards allow only writing and reading of data. Smart cards, in addition to these functions, also possess functions for structuring of the data, for isolating the data, for administration of the data and for protection of the data.

A chip card typically contains a chip, on which a microprocessor and a memory are integrated. The memory is further divided into a number of individual areas which may be implemented differently according to function.

The chip card contains as a first memory area a nonvolatile memory which may not be written to, which is usually designed as a ROM (Read Only Memory), and which shall hereinafter be referred to as a ROM. The ROM generally contains the operating system of the chip card. Furthermore, programs are stored in the ROM which have general functions, for example converting a data flow or coding, or for performing input/output with an automatic machine (for instance, by a "handshake" procedure with an automatic cash machine).

As a further memory area, the chip card has a non-volatile memory which may be written to, which in general is designed as an EEPROM (Electrical Erasable Programmable Read Only Memory), or as an EPROM (Electrical Programmable ROM) or as an OT/PROM (One Time PROM). For the sake of simplicity, the nonvolatile memory which may be written to shall hereinafter be designated as EEPROM without, however, indicating thereby a limitation of those non-volatile memories which may be written to as only EEPROMs. Application programs are stored in general in the EEPROM for applications with the chip card.

Finally, the chip card generally has yet another volatile memory which may be written to and which is in general designed as a RAM (Random Access Memory), and which shall hereinafter be designated as a RAM. The RAM serves as the working memory for the microprocessor of the chip card, especially for buffer storage of data.

The functional principle of the chip card shall be explained through the example of a cash chip card. After the chip card is introduced into the automatic cash machine, the microprocessor of the chip card is linked to the automatic machine and set into operation. For the data exchange ("handshake"), the chip card first sends a random number to the automatic cash machine. The automatic cash machine encodes this random number in a second step and sends it back to the chip card as an encrypted number. In a third step, the chip card decrypts the received number with the use of a key and compares the received result with a pre-calculated result. The random number as well as the decrypted calculations are stored in the working memory of the chip card (RAM). The decryption key is filed in the ROM on the other hand, since this key must be especially protected in order to prevent manipulation.

In a fourth step, the automatic cash machine sends a random number to the chip card, which the chip card, in a fifth step, in turn encrypts and sends back to the automatic cash machine. The decryption on the part of the automatic cash machine takes place in a sixth step which is similar to the third step. If the process has been performed successfully to this point, then the chip card and the automatic cash machine are ready for the data exchange, whereby the data exchange generally takes place through encoded data. To perform this, a corresponding application program which is stored in the chip card is invoked. As an application in the example given here, a money deposit with a specific sum shall be performed.

The automatic cash machine queries the chip card as to which application shall be performed, and the chip card answers with: "Cash deposit." Next, the automatic cash machine requests the sum which is to be deposited, and receives the desired amount from the chip card as an answer. At this point, a command is given by the application program on the chip card to write the desired cash sum to a specific area on the EEPROM.

From this example it becomes clear that, after it is invoked, the application program assumes "authority" over the chip card, and hence over the data stored on the chip card. Up to now, only one application has been implemented on each chip card. If, however, several application programs are to be loaded on a chip card, protection must be provided for those programs which may contain sensitive data, so that neither these sensitive data or possibly the entire program may be read out. The problem with the use of chip cards with multiple application programs (the so-called multifunction or multifunctional chip cards) is that access to the application program must be granted to the operator of an application (for instance a bank). However, once he has access to the chip card through the application program, and if he is allowed thereby the authority of use over the chip card by means of the application program, then he may "move freely" on the chip card. He can, if he has the intention of doing so, write his application program in such a manner that the program, along with the intended function, will also perform other activities, without the owner or user of the chip card being aware of it or being capable of having awareness of it. Thus, the operator of the application program may also gain secret information from application programs, such as code numbers or the type and extent of the activities of the other application programs, for example. On the other hand, a different operator of a different application program, or someone who represents himself as such, may look at the secret information of other applications and modify his application accordingly, for example by charging money improperly to a card through knowledge of the functional properties of a cash application.

Memory protection for chip cards is known from IBM Technical Disclosure Bulletin, Vol. 32, Nr. 5a, October 1989, pp. 416–417, hereinafter referred to as TDB Document. For this, the memory of the chip card is divided into a protected and an unprotected area, whereby the operating system and special codes are located on the protected area, while a series of application programs may be filed on the unprotected area. The memory is monitored by an address decoding unit. The address decoding unit responds with a "true" signal when the address on the address bus is located within the monitored area. When the application program attempts to gain access to the protected memory area, the address decoding unit recognizes this and gives a non-maskable interrupt signal to the microprocessor. The microprocessor then directly deletes the data loaded in the register. Through this, only the operating system itself can have access to the protected area of the memory. Application programs hence have no access to the codes and the operating system which are filed on the protected memory area. However, this solution presents the problem that only the operating system, or data for special protection such as codes, can be protected against unauthorized access to the application programs on the chip card. However, the application programs can access each other completely and without interference, so that no reciprocal protection exists.

SUMMARY OF THE INVENTION

The above mentioned problems and other limitations of the prior art are solved by the present invention which has the advantageous effect of allowing multiple application programs to securely reside on one chip card, while the application programs which are stored on the chip card do not have access to each other.

In accordance with the invention, multiple application programs are placed on one chip card without compromising security by the de-coupling and the separation of the individual programs from one another which is provided by the invention.

In a first embodiment, multiple mutually-independent units consisting respectively of a processor unit and a memory unit are placed on one chip card so that each memory unit is isolated from other processors by its own processor. Each of these independent units corresponds essentially in structure and function to the chip of a traditional chip card with the corresponding security and coding systems. Communication of these independent units with the external world, and also with each other on the chip card when required, takes place through a control unit, which "administrates" the individual independent units. An advantageous effect of the present invention is that communication of the independent units among each other may only occur through the respective processor units, so that access to the linked memory units may not be gained through circumvention of the corresponding processor units.

The integration of multiple independent units on the chip card in accordance with the first embodiment allows a simple and secure juxtaposition of several applications without these being able to influence each other, or without their being able to gain unauthorized access to each other. A chip card with four independent units, as an example, thus allows at least four independent applications with one and the same physical chip card, while ensuring the greatest possible security.

Since the processors for each of the independent units may be identically structured, and also since they contain in general no information or secrets, and only the corresponding memory units for each application are different and may contain secret information, an integration of the processors of the independent units would be desirable. Also, the integration of processors to a single processor on the chip card would mean a significant reduction in costs and space required on the chip, since the processor portion in general requires more space on the chip than the memory portion. However, such integration leads to the same problem as described initially, that there must be reciprocal protection against the possibility of influence and unauthorized access to the applications.

The dividing of the different applications on a chip card with a processor takes place in accordance with the invention through the insertion of a means of separation, preferably hardware-supported, of the application segments in the memory area of the chip card. The separation of the present invention has the advantageous effect that each application may only access a specified area within the memory, and that access outside of the predetermined memory area may be disabled for this application. Preferably, the preset access area of an application will be specified in the memory area required for storage of this application, supplemented by a possible buffer-memory area. Furthermore, access may be enabled to areas of the memory which contain generally-accessible data of the operating system, so that general functions may be used by the operating system of the chip card, for example.

Upon the attempted access of an application to a memory area outside of the authorized memory area for the application, an interrupt signal occurs, preferably a non-maskable interrupt, which can lead for example to the disabling of the chip card or to a resetting of the application, that is, that the application is placed once again at the first step in the "handshake" with the sending of a random number. In another process, a memory area (for example in the EEPROM) may be provided, wherein the application which had attempted to access addresses outside of the area for which it is designated is noted. This area may then be polled, so that a security check of the application is made possible. Instead of the non-maskable interrupt, the memory area outside of the specified area of an application may also be disabled, so that an attempted access to it is not successful and only a series of zeros or ones is delivered in return, for example.

The separation of the applications preferably takes place with the use of an application table in accordance with the invention. The application table stores the beginning and the end of the memory area, in which a respective application is stored or executes or may execute—that is, to which it may have access. Each application receives the corresponding assigned memory area, preferably in a fixed manner, when the application is programmed, for example. The application table has information regarding an initial address and an end address of a respective application. When a respective application is invoked, the initial and end addresses of the application are loaded from the application table into initial and end registers which are provided for this purpose. With the use of an address comparator, there is constant monitoring as to whether the application has left the predetermined memory area or not. If the application leaves the area assigned through the initial and end address, for example by providing as the next address an address outside of the area to an address bus, then preferably a non-maskable interrupt signal will be triggered, which interrupts the currently-running program of the application and its execution. By a non-maskable interrupt signal, a signal which cannot be switched off or suppressed by the application is meant. Thus it is ensured that the application program works in a closed environment, similar to the environment on a chip card with only one application.

In contrast to the aforementioned TDB Document, several memory areas may be entered dynamically into the application table and thus protected from unauthorized access. Corresponding to the aforementioned TDB Document, the area to be protected must nevertheless be predetermined in a fixed manner, and the remaining memory area, which of itself cannot be further protected, remains open to access so that applications in this area are not separated from each other and thus may have access to each other. In contrast thereto and corresponding to the theory of the invention, several memory areas may be defined which can be activated dynamically, so that an activated area is freely accessible, while the non-activated areas nonetheless remain protected.

Upon loading of a specific application, the initial and end register are loaded with the corresponding initial and end addresses of the memory area to be activated. The memory area in which the application may execute is thus dynamically determined.

It is to be understood that the initial and end addresses of the respective memory areas in the application table should be written in such a manner that a redefinition of these addresses is not possible through the application or any other application. The definition of the addresses in the application table therefore takes place preferably through fixed programming in the operating system which determines the addresses from the contents of the documented application table at the time the application is loaded. This process may be performed automatically and independently of the application. The new initial address may be derived from the occupied addresses. The end address then results from the size of the application. This process is transparent for all applications and securely fixed in the operating system, so that there are no exposed points for possible manipulation.

For separation of the applications in the memory of the chip card, further hardware-supported means may be used instead of the application table, which are preferably dynamically loaded with a respective application, and which dynamically separate the memory areas of the applications from each other. Register bits which can designate and activate the selected application area may serve as such means, as an example. Multiple separated memory areas may also be linked to the processor through a selector module. The control of the selector takes place preferably through the presetting of coding bits. The administration and storing of the assignment of the coding to bits or register bits to the individual applications must take place through a separately-identified memory medium, similar as with the application table. This must take place transparently for all applications.

In a further embodiment of the invention, separation of the applications takes place through the use of a multiplexer or other electronic circuits which are suitable in each instance to switch a selected signal to an output from a certain number of adjacent input signals. A processor of a chip card is connected here with such a multiplexer, which in turn is connected with a number of memory areas which may be dynamically selected through the multiplexer. The application programs which are filed in the respective memory areas may hold the same address space, that is, all application programs may begin with the same address. This simplifies the compilation of the application programs. Administration of the application areas becomes simpler, since it is closer to the programming of applications on separate chip cards. The multiplexer preferably has a register which may be dynamically loaded and which either grants access to the processor or disables a corresponding area from the number of memory areas. This embodiment corresponds to the representation of several chips on a single chip card, whereby the processor has multiple use. Switching between the memory areas by means of the multiplexer corresponds to the electronic removal and replacement of an individual chip card or memory card.

The invention thus makes possible a secure and simple implementation of multiple application programs in one chip card, without the implemented application programs having access to one another or being able to influence each other.

It is to be understood that certain exceptions for access to the memory or to certain memory areas in general may be allowed, so that common functions may be used by the operating system or in order to read data which do not require protection, for example.

The invention is especially suited for applications with multi-functional chip cards, or allows for the first time their application under the prescribed security conditions.

BRIEF DESCRIPTION OF THE DRAWINGS

Examples of the invention's embodiments follow, with reference to the drawings, for a more exact description of the invention. Functionally-similar elements have the same reference coding.

DESCRIPTION OF THE PREFERRED EMBODIMENTS

Figure 1:
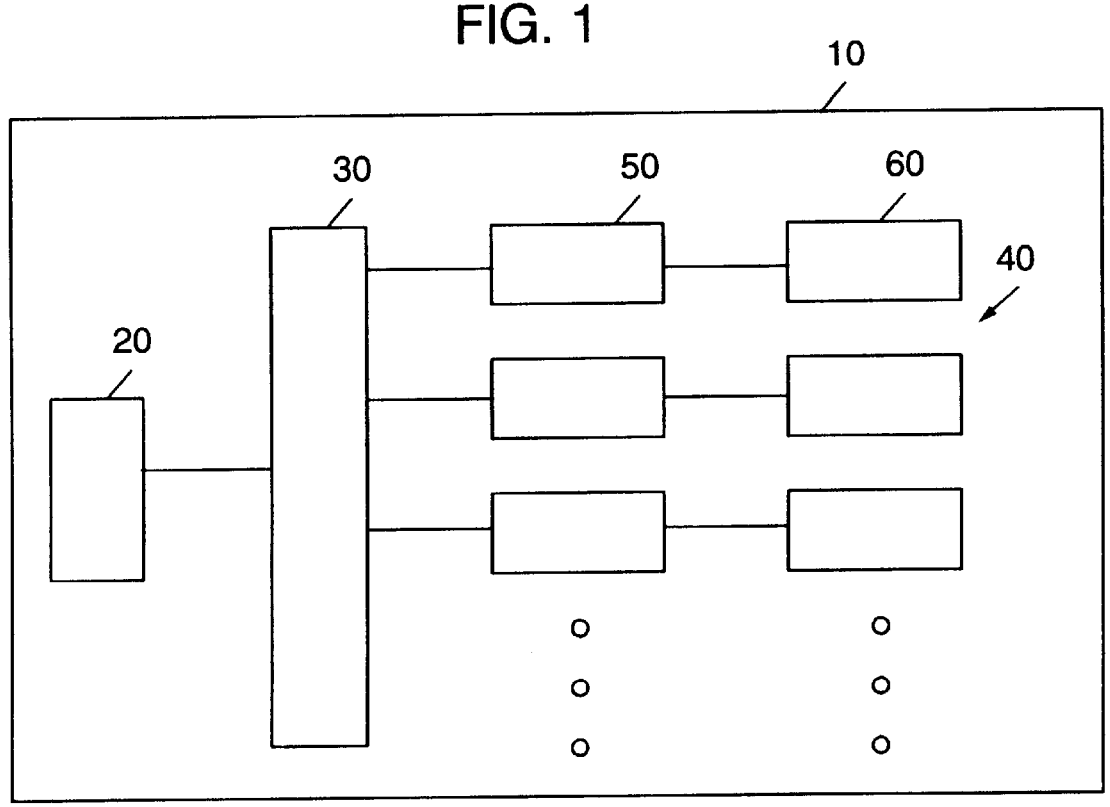
FIG. 1 depicts a first embodiment of a chip card in accordance with the invention for the recording of a number of applications.

FIG. 1 depicts a first embodiment in accordance with the invention of a chip card 10 for the recording of a number of applications. The chip card 10 has a contact field 20 which represents the physical contact to the external world. A control unit 30 is connected to the contact field 20, and is in turn also connected to a series of independent units 40. Each of the individual independent units 40 consists of a separate microprocessor 50 and a separate memory unit 60. Each of the individual independent units 40 represents a closed functional unit. The respective memory unit 60 of one of the independent units 40 is only accessible through the corresponding microprocessor 50 which belongs to it, and may be protected by means of corresponding security procedures which are known to the state of the art. An unauthorized access by one of the independent units 40 to one of the other independent units 40, as well as corresponding reciprocal influence, can be disabled in this way by means of security precautions as are currently known for chip cards. In other words, each of the independent units 40 represents functionally a single chip card. Each of the independent units 40 can furthermore record at least one application program in its memory 60, whereby each of the independent units 40 preferably has only one application program respectively.

The control unit 30 is preferably implemented as an electronic switch which is controlled by the automatic machine with which the chip card communicates. This switch has the responsibility of deflecting the data contacts to the selected application in the corresponding independent unit. This process corresponds approximately to the selection procedure from several chip cards and in general does not have to be separately protected.

Figure 2:
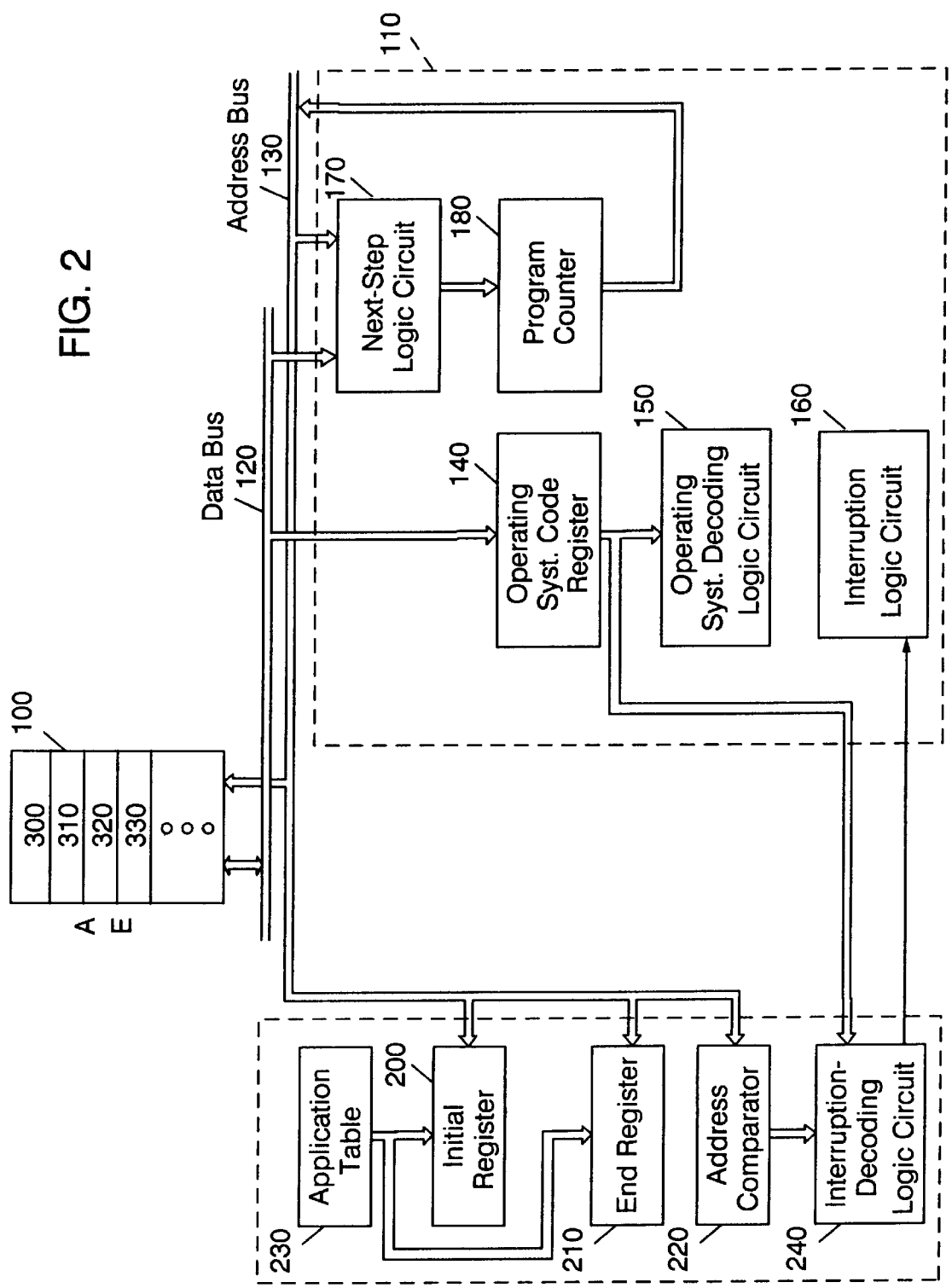
FIG. 2 depicts the architecture of a further embodiment of the invention with only one common memory and one common processor.

FIG. 2 depicts the architecture of a further embodiment of the invention. In contrast to the embodiment in FIG. 1, this embodiment has only one (common) memory 100 which is connected with one (common) processor area 110 through a data bus 120 and an address bus 130. Along with a series of functional units which are not represented here, the processor 110 represented as an example in FIG. 2 has an operating system code register 140 which is connected through the data bus 120 with the memory 100, and which is in turn connected with an operating system decoding logic circuit 150. The processor 110 further contains an interruption logic circuit 160, a next-step logic circuit 170 which is coupled with the data bus 120 and the address bus 130, and a program counter 180, which is coupled with the next-step logic circuit 170 as well as with the address bus 130. Further functional units of the processor 110 are not shown or mentioned here for the sake of simplicity.

Furthermore, an initial register 200, an end register 210 and an address comparator 220 are connected with the address bus 130 and the data bus 120. The initial register 200 and the end register 210 are further coupled to an application table 230. The address comparator 220 is connected with an interruption decoding logic circuit 240, which in turn is coupled with the operating system code register 140, the operating system decoding logic circuit 150 and the interruption logic circuit 160.

In the memory 100, there is a series of application programs 300, 310, 320, and 330. Each of these application programs 300 to 330 has hereby an initial address A and an end address E, as is depicted for the application program 320 as an example. These initial and end addresses of the application programs 300 to 330, which are stored in the memory 100, are filed in the application table 230 with reference to the respective application program. If, for example, the application program 320 is invoked, then the initial address A of the application program 320 is loaded from the application table 230 into the initial register 200, and correspondingly, the end address E of the application program 320 is loaded from the application table 230 into the end register 210.

During the processing of the application program 320, the address comparator 220 compares the addresses filed on the address bus 130 for the memory 100 with those addresses filed in the initial register 200 and the end register 210. If the address comparator 220 recognizes an address filed on the address bus 130 for the memory 100 which lies outside of the address area which is described by the initial address A filed in the initial register 200 and the end address E filed in the end register 210, then the address comparator 220 initiates a signal to the interruption-decoding logic circuit 240, which in turn acts upon the interruption logic circuit 160. It may be understood here that both the interruption-decoding logic circuit 240 as well as the interruption logic circuit 160 both represent a non-maskable interrupt signal which cannot be disabled by the application 320, for example.

The initial and end addresses of the application programs 300 to 330, which are filed in the application table 230, are preferably stored in a fixed manner filed in the application table 230 at the time of loading of the application programs on the chip card, and can no longer be modified, for example through one of the application programs 300 to 330. This takes place preferably through a burn-in of the addresses into a memory area of the application table 230. The burn-in of the addresses is a fixed programming procedure which cannot be accessed and which always writes the new addresses as a result of the calculation of the filed addresses. Thus it is ensured that no overlapping of the memory area is possible. This process is preferably coded in the operating system in a fixed manner and can only be initiated. It is fully transparent and cannot be manipulated.

Definite separation of the application programs 300 to 330 from each other in the memory 100 is ensured through the application table 230 and in conjunction with the initial register 200, the end register 210 and the address comparator 220. The application table 230 is preferably structured as an extra memory, for instance in an EEPROM or an OT-PROM of the chip card, and has its own protected access mechanism.

In the place of the address comparator 220 which constantly monitors the addresses filed on the address bus 130, a decoder may also be used which decodes and authorizes the address area authorized by the initial and end registers. Addresses outside of this area are ignored, and the effect thereby is, for example, as if access-attempt had been "into empty space".

The initial register 200 and the end register 210 are loaded upon invoking of one of the application programs 300 to 330 from the memory 100 with the initial and end addresses from the application table 230 which pertain thereto, and thus represent dynamic memory protection.

A separation of the application programs 300 to 330 which are loaded in the memory 100 may furthermore be achieved with the help of extra hardware components, for example in the form of register bits, which are dynamically loaded with each of the stored application programs. These extra register bits may designate and activate the selected memory area in the memory 100, for example. To achieve this, the entire memory area of the memory 100, or correspondingly only portions thereof, is divided into blocks which each have a separate enable or request input. Instead of an activation or deactivation of memory areas by means of the application table 230 in FIG. 2, the corresponding areas in the memory 100 are either activated or deactivated with the register bits. Presetting of the register bits preferably takes place through an automatic mechanism which sets the corresponding bits at the selection of the application. The assignment of the application to the register bits is implemented and organized in a specially-protected memory area, corresponding to the said application table. If a register bit is set, then it is not possible to read from the corresponding area in the memory 100.

Figure 3:
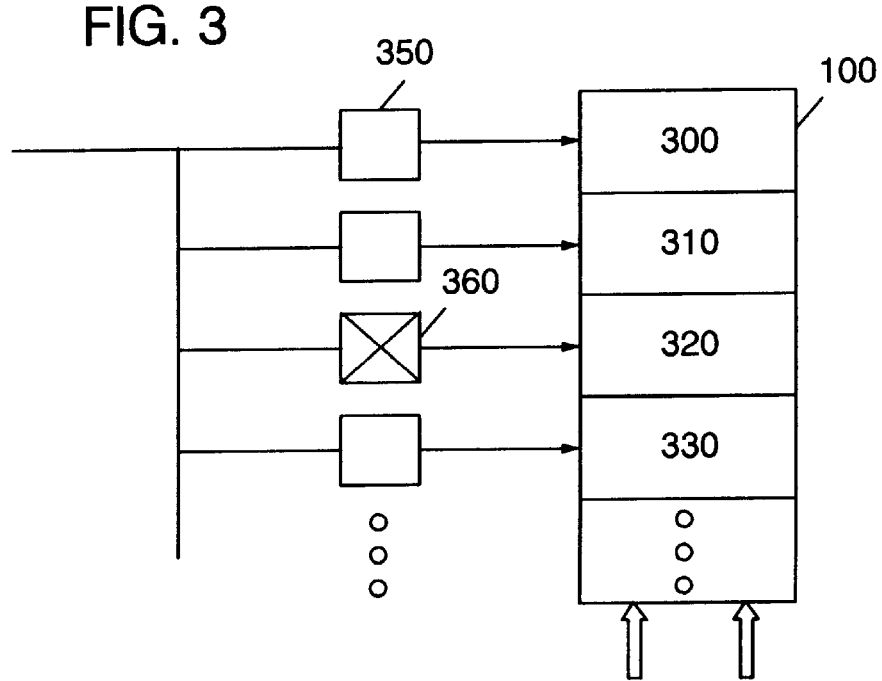
FIG. 3 depicts a configuration in accordance with the invention with register bits, represented for the memory according to FIG. 2.

FIG. 3 depicts this type of configuration with register bits, represented for the memory 100 in accordance with FIG. 2. The memory 100 is here divided into individual memory areas corresponding to the application programs 300 to 330. Each of the individual memory areas may be activated or deactivated by means of a number of request registers 350. In the example depicted in FIG. 3, only the memory area for the application program 320 is activated by the setting of one of the corresponding register bits in a request register 360 which is assigned to this memory area.

From the example depicted in FIG. 3, it may be understood that the request register 350 can activate or deactivate in each case an entire program from the application programs 300 to 330, or also only portions thereof. A corresponding fine adjustment of the memory areas of the memory 100 may be required per application, for example, an application may require several bits. The number of bits indicates the size of the application.

The separation of the application programs in the memory in accordance with FIG. 3 is easy to implement, but may be modified by intended or unintended voltage actions, for example through a short voltage interference, so that the register bits in the request registers 350 can unintentionally "trip". Therefore, instead of the individual register bits, bit chains may be used for activation or deactivation of the request registers 350.

Figure 4:
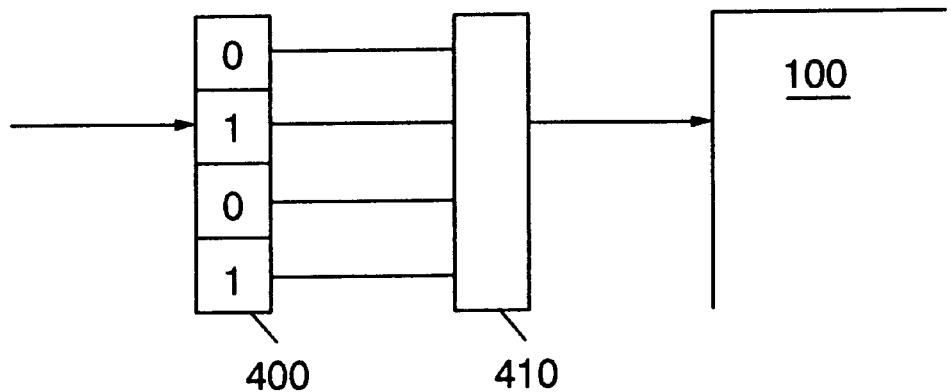
FIG. 4 depicts a configuration in accordance with the invention and according to FIG. 3, whereby a combination of multiple bits is implemented as a request combination for expanded protection instead of a one-bit request.

As further protection, a combination of several bits may be implemented as a request combination instead of a one-bit request. FIG. 4 depicts such a configuration. A request combination 400 in FIG. 4 is connected with the memory 100 through a decoding-logic circuit 410. The problem of the individual bits all tripping to zero or to one during voltage interference may be avoided through a combination of zeros and ones. The bit chains which belong to a selected application are loaded with a pre-defined pattern at loading of the application, which preferably consists of a combination of zeros and ones. Only the decoding of the correct pattern allows access. It is highly improbable that this type of pattern may be accidentally generated.

Figure 5:
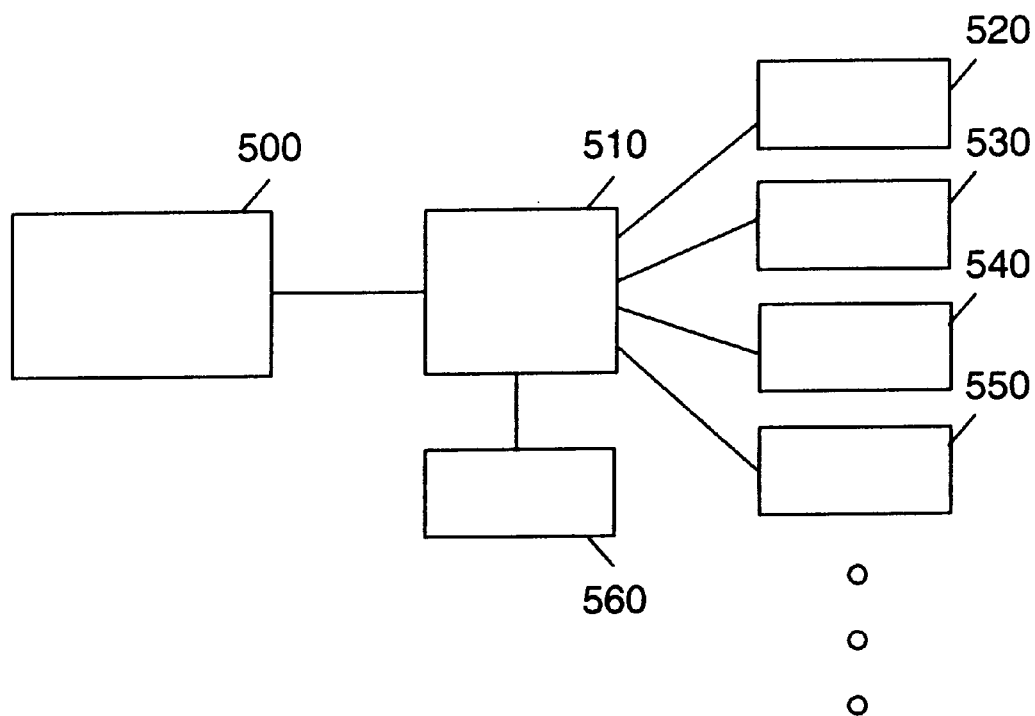
FIG. 5 depicts a further configuration in accordance with the invention for separation of different application programs, wherein a processor of a chip card is connected with a multiplexer, which is in turn coupled with a number of memory areas.

FIG. 5 depicts a further configuration for the separation of different application programs in accordance with the invention. A processor 500 of a chip card is linked here with a multiplexer 510, which in turn is coupled with a number of memory areas 520, 530, 540 and 550. The individual memory areas 520 to 550 are selected dynamically through the multiplexer 510 in this embodiment. The respective application programs filed in the memory areas 520 to 550 may all occupy the same address space, that is, all application programs may begin with the same address. The multiplexer 510 preferably has a register 560 which can be loaded dynamically and which can either grant access to the processor 500 or disable a corresponding area from the number of memory areas 520 to 550. The switching between the memory areas 520 to 550 by means of the multiplexer 510 corresponds to the electronic removal and replacement of the respective chip card.

While the invention has been shown and described with respect to the preferred and alternate embodiments, it will be understood by those skilled in the art that various changes in form and detail may be made without departing from the spirit and scope of the invention which is measured by the following claims.

We claim:

1. A data-carrier card comprising a memory for recording a plurality of applications and a processor, the card further comprising:

means for separating at least two of said applications in the memory, so that each application may only gain access to a specified predetermined memory area within the memory, and that access of applications outside of the specified predetermined memory area in the memory for the respective application is disabled; said means for separating further comprising:

an application table, which has stored the information concerning an initial address A and an end address E of the memory area in which a respective application may have access; and address-monitoring means which monitors the addresses filed on an address bus to ensure that the filed addresses locate a memory area A to E of the application in the memory which is defined by the initial address A and the end address E of the respective application, and which initiates an appropriate action when one of the addresses filed on the address bus is not located within the memory area A to E of the application in the memory; said address-monitoring means further comprising:

address decoder means which decodes and authorizes the memory area, whereby addresses outside of the memory area are ignored.

2. A data-carrier card according to claim 1, wherein the address-monitoring means further comprises:

an initial register for recording the initial address A of the memory area in which the respective application may have access;

an end register for recording the end address E of the memory area in which the respective application may have access;

an address comparator which compares the addresses filed on the address bus with those addresses A and E filed in the initial register and the end register; and monitoring means which signals when one of the filed addresses is not found to be within the address range A to E of the application in the memory which is defined by the addresses A and E filed in the initial register and the end register respectively.

3. A data-carrier card comprising a memory for recording a plurality of applications and a processor, the card further comprising:

means for separating at least two-of said applications in the memory, so that each application may only gain access to a specified predetermined memory area within the memory, and that access of applications outside of the specified predetermined memory area in the memory for the respective application is disabled; wherein the means for separation further comprises:

a multiplexer which is connected to a number of memory areas, whereby the individual memory areas may be dynamically selected through the multiplexer, the multiplexer further comprising:

a register which may be loaded dynamically and which provides access by the processor to a memory area and which disables others of the number of memory areas.

* * * * *